（12) United States Patent
Schack et al.

(10) Patent No.: US 7,907,840 B2
(45) Date of Patent: Mar. 15, 2011

(54) COMPRESSIBLE ZOOM CAMERA

(75) Inventors: Goran Schack, Ahus (SE); Olof Simonsson, Dalby (SE); Stjepan Begic, Bunkeflostrand (SE); Gustav Fagrenius, Dalby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 12/686,156

(22) Filed: Jan. 12, 2010

(65) Prior Publication Data
US 2010/0110284 A1 May 6, 2010

Related U.S. Application Data

(62) Division of application No. 11/456,374, filed on Jul. 10, 2006, now Pat. No. 7,680,404.

(51) Int. Cl.
*G03B 15/03* (2006.01)
(52) U.S. Cl. .............................. 396/177; 348/375; 362/8
(58) Field of Classification Search .................... 396/72, 396/155, 176, 177, 348, 429, 535; 348/14.02, 348/374–376; 362/3, 8; 455/90.3, 573
See application file for complete search history.

(56) References Cited

U.S. PATENT DOCUMENTS

| 2004/0189597 A1 | 9/2004 | Amitani et al. |
| 2005/0014527 A1 | 1/2005 | Chambers et al. |
| 2007/0009247 A1 | 1/2007 | Maeda et al. |

FOREIGN PATENT DOCUMENTS

| EP | 1 613 026 A1 | 1/2006 |
| EP | 1 653 713 A2 | 5/2006 |
| GB | 2 416 036 A | 1/2006 |
| JP | 2005-164883 A | 6/2005 |
| WO | WO 2004/054229 A1 | 6/2004 |

OTHER PUBLICATIONS

International Search Report/Written Opinion for corresponding PCT Application No. PCT/IB2007/050078, dated Jun. 5, 2007.

*Primary Examiner* — Christopher E Mahoney
*Assistant Examiner* — Autumn Parker
(74) *Attorney, Agent, or Firm* — Harrity & Harrity, LLP

(57) ABSTRACT

A device includes a housing capable of forming an internal space during operation of the device. The device also includes a camera having an optical zoom portion provided within the housing. The optical zoom portion is capable of expanding into the internal space when the camera is in use.

20 Claims, 13 Drawing Sheets

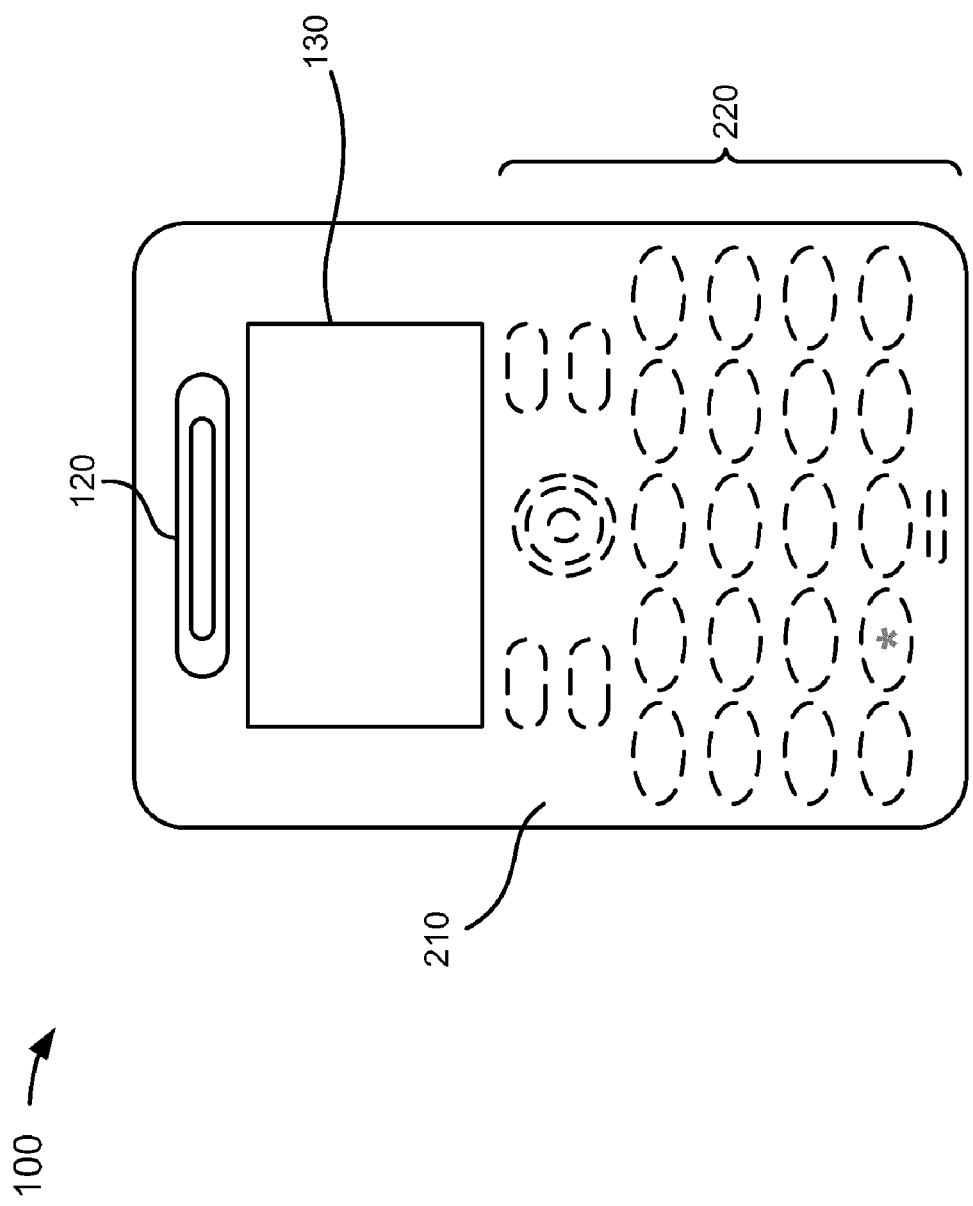

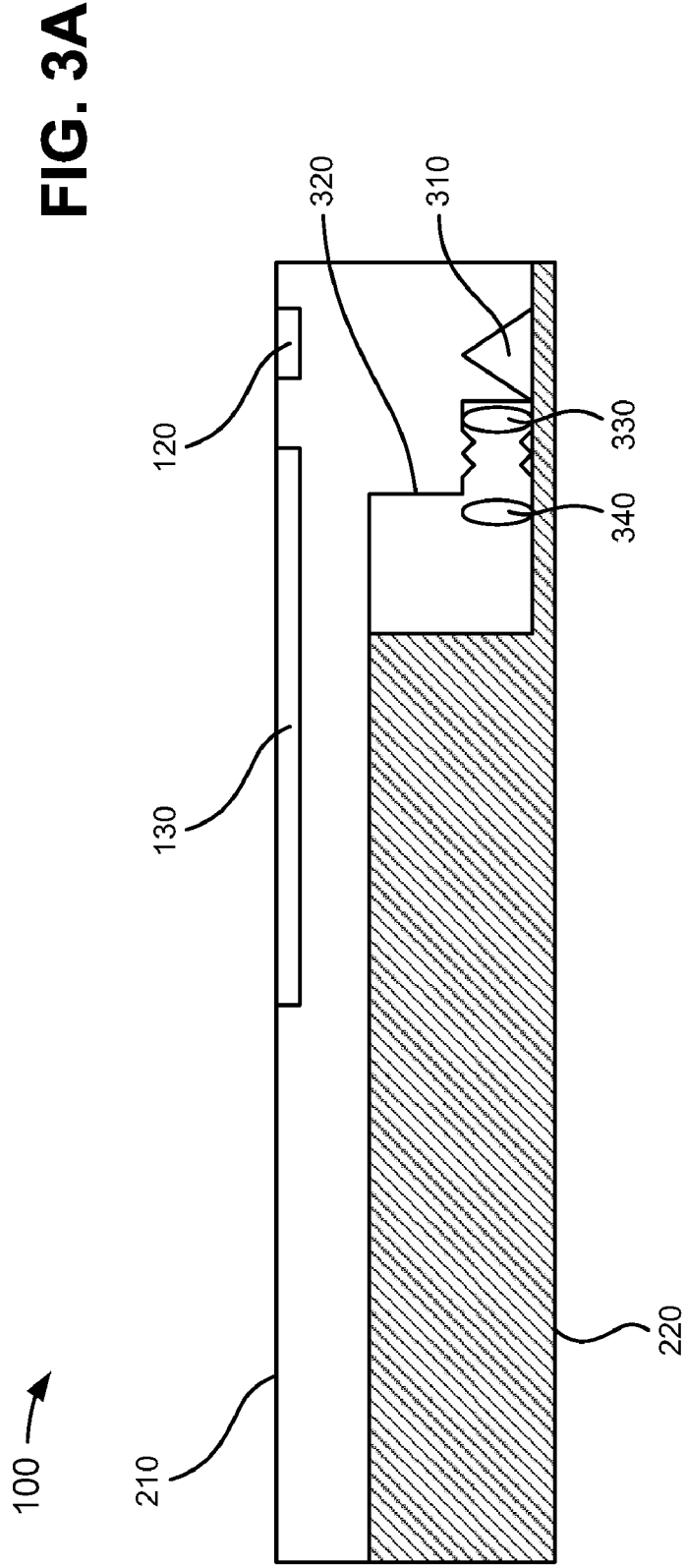

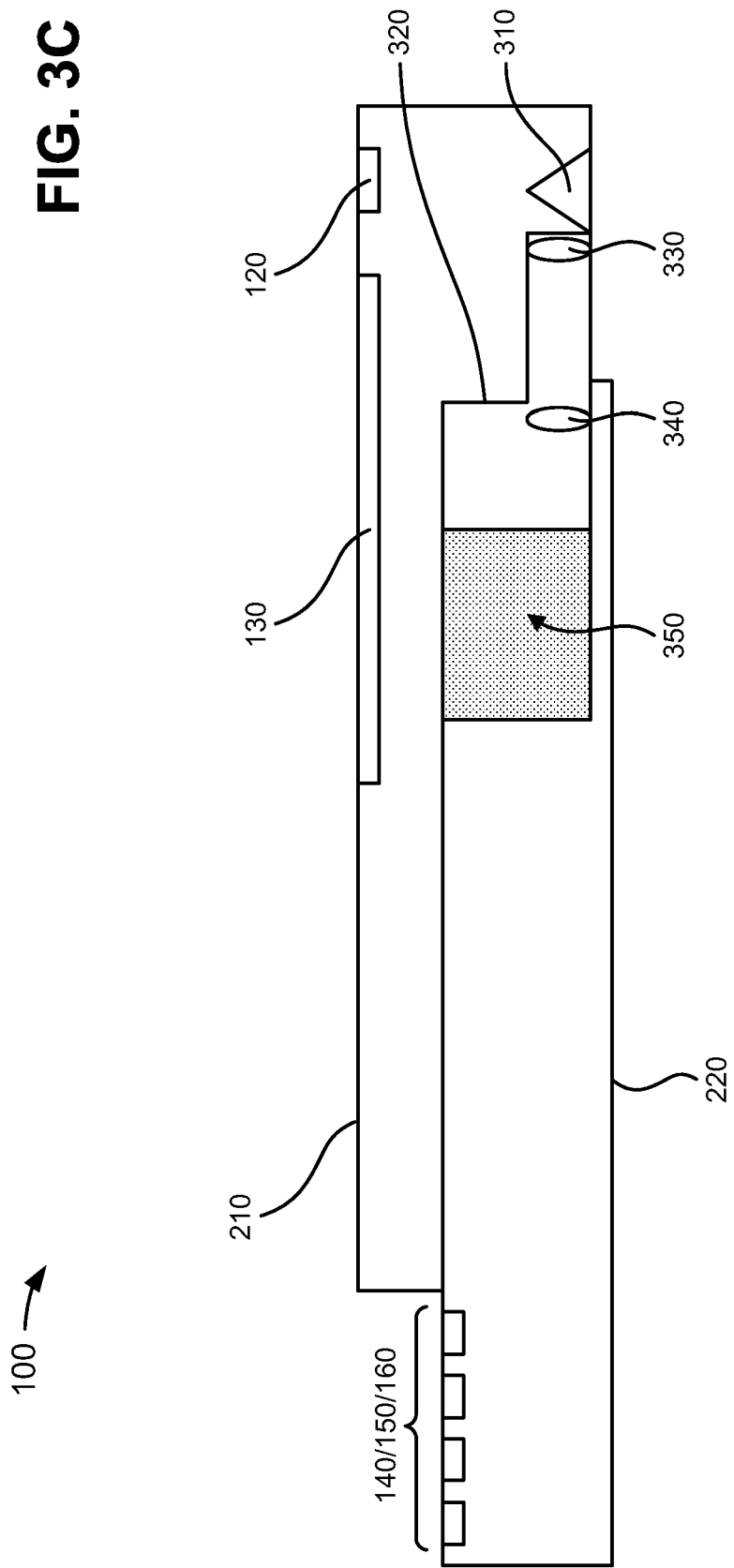

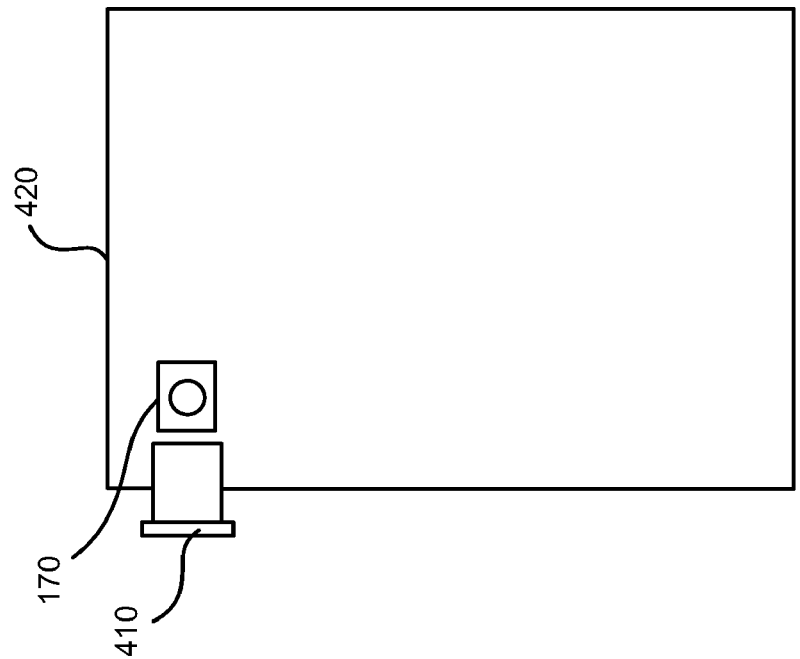
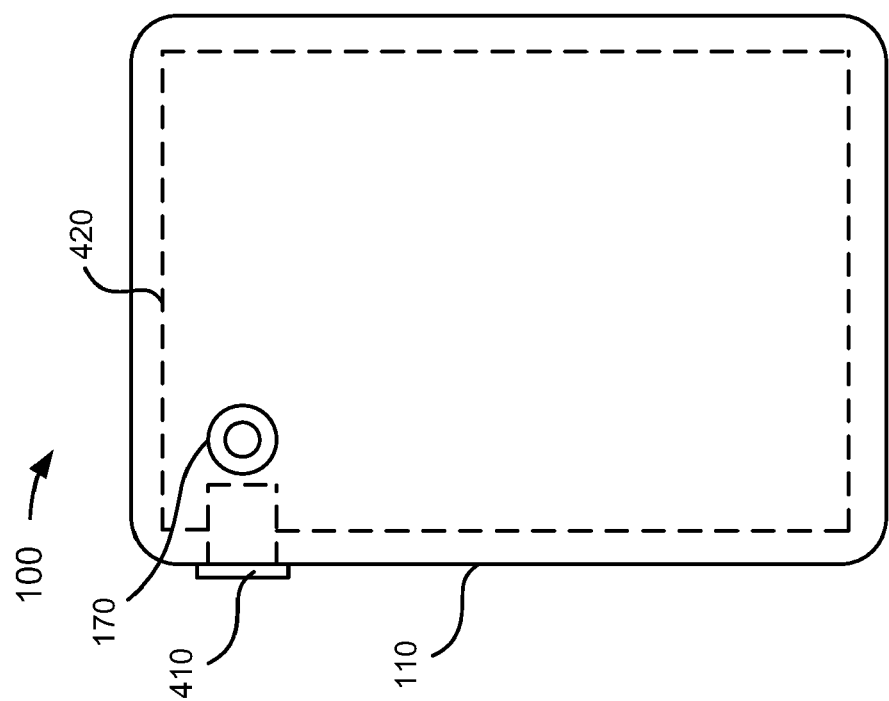

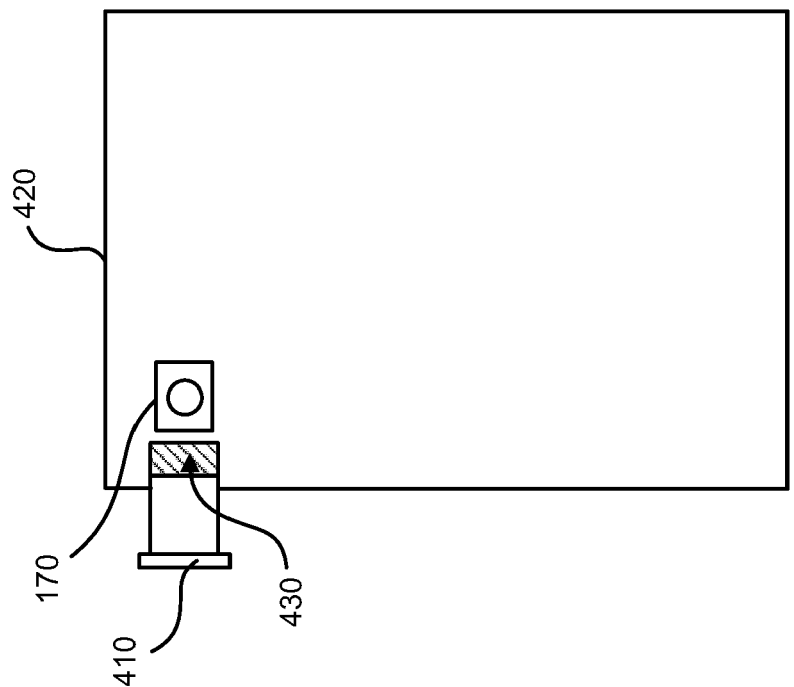
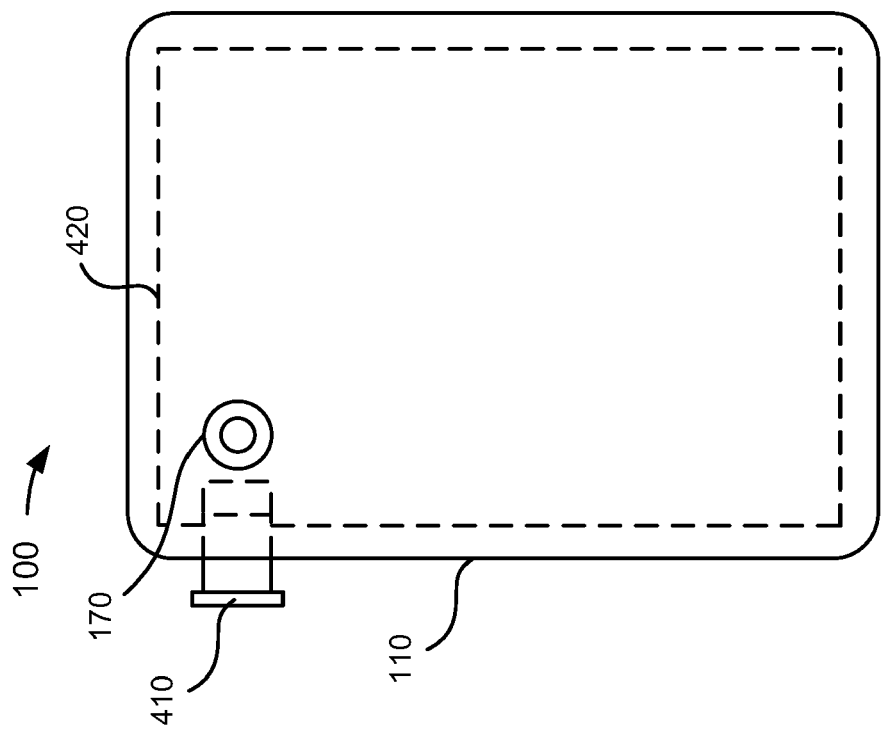

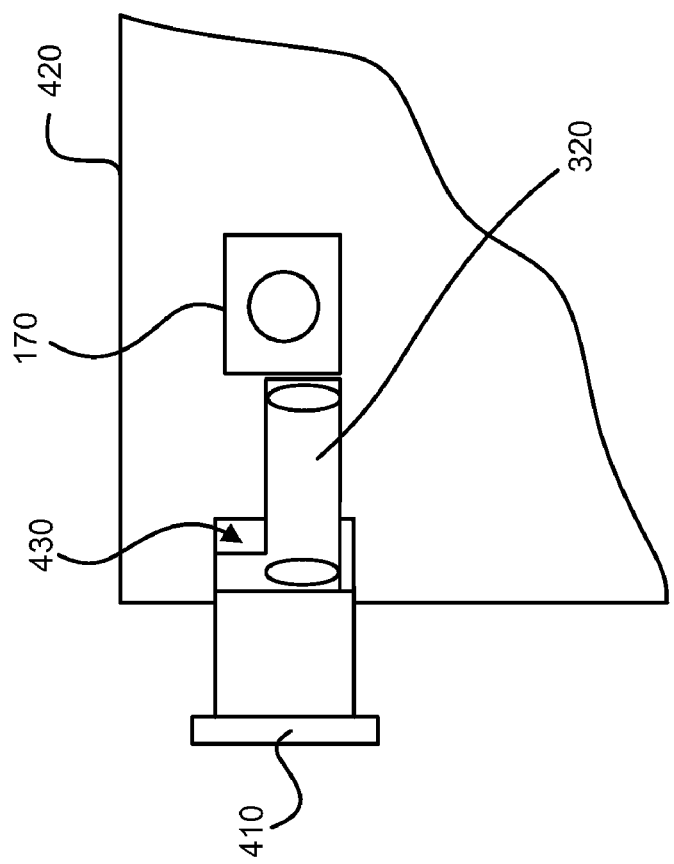
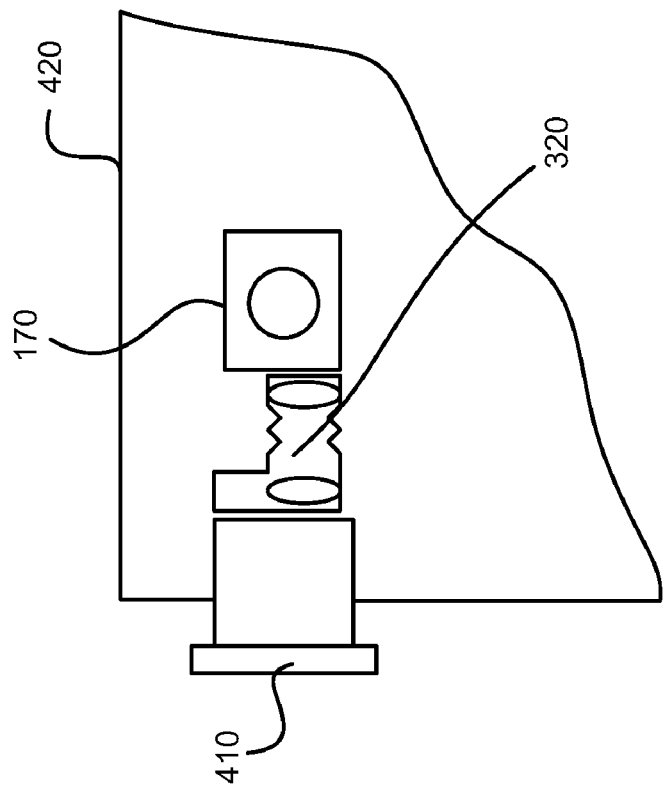

COMPRESSIBLE ZOOM CAMERA

RELATED APPLICATIONS

This application is a divisional of U.S. patent application Ser. No. 11/456,374, filed Jul. 10, 2006, the entire disclosure of which is incorporated herein by reference.

BACKGROUND

1. Field of the Invention

Implementations described herein relate generally to devices and, more particularly, to a compressible zoom camera for devices.

2. Description of Related Art

A camera module with an optical zoom portion presents problems for a device (e.g., a mobile communication device) because the optical zoom portion consumes valuable space within the device, which may require the size of the device to be increased. For example, a mobile communication device may include a camera with an optical zoom portion to enable a user to zoom in on and/or capture images and video with the device. One reason for not using such optical zoom cameras is the extra space required in the device for the lens and/or lenses of the optical zoom portion to move. However, adding extra space for optical zoom cameras is not desirable in today's world of small, sleek devices.

SUMMARY

According to one aspect, a device may include a front portion, and a rear portion slideably connected to the front portion. A space may be formed between the front portion and the rear portion when the rear portion moves away from the front portion. The device may also include a camera with an optical zoom portion provided within the front portion. The optical zoom portion may be capable of expanding into the space.

Additionally, the front portion may protect the camera when the rear portion is moved toward the front portion.

Additionally, a rear surface of the front portion may include an opening for exposing a portion of the camera.

Additionally, the exposed camera portion may include a prism.

Additionally, the front portion may include at least one of a display or a speaker.

Additionally, the rear portion may include at least one of a keypad, a control button, or a microphone.

Additionally, the front portion may protect the rear portion when the rear portion is moved toward the front portion.

Additionally, the optical zoom portion may expand when the camera is in use and the space is formed.

Additionally, the optical zoom portion may compress when the camera is not in use.

Additionally, the optical zoom portion may be prevented from expanding if the camera is in use and the space is not formed.

Additionally, the optical zoom portion may include at least one moveable lens and at least one fixed lens. The moveable lens may move away from the fixed lens when the optical zoom portion expands into the space.

Additionally, the rear portion may be one of manually, mechanically, or electromechanically moved away from the front portion.

Additionally, the optical zoom portion may be one of mechanically or electromechanically expanded into the space.

According to another aspect, a device may include a housing with an opening, and an extendible flash provided in the housing opening. The extendible flash may be capable of extending from the opening, and a space may be formed when the extendible flash extends from the opening. The device may also include a camera with an optical zoom portion provided within the housing. The optical zoom portion may be capable of expanding into the space.

Additionally, the device may further include a substrate provided within the housing. The space may be formed between the substrate and the extendible flash when the extendible flash extends from the opening.

Additionally, the housing may protect the optical zoom portion of the camera.

Additionally, the optical zoom portion may expand when the camera is in use and the space is formed.

Additionally, the optical zoom portion may compress when the camera is not in use.

Additionally, the optical zoom portion may be prevented from expanding if the camera is in use and the space is not formed.

Additionally, the optical zoom portion may include at least one moveable lens and at least one fixed lens. The moveable lens may move away from the fixed lens when the optical zoom portion expands into the space.

Additionally, the device may further include at least one of a display, a speaker, a keypad, a control button, or a microphone.

Additionally, the extendible flash may be one of manually, mechanically, or electromechanically extended from the opening.

Additionally, the optical zoom portion may be one of mechanically or electromechanically expanded into the space.

According to yet another aspect, a device may include a housing capable of forming an internal space during operation of the device, and a camera with an optical zoom portion provided within the housing, the optical zoom portion being capable of expanding into the internal space when the camera is in use.

According to a further aspect, a method may include creating an internal space in a device including a camera with an optical zoom portion, activating the optical zoom portion of the camera, and expanding the optical zoom portion of the camera into the internal space when the camera is in use.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 2A is a front view of an exemplary slider version of the exemplary device of FIG. 1 in a closed position according to an implementation consistent with principles of the invention;

FIG. 3A is a side elevational view, in partial cross section, of the exemplary slider device of FIGS. 2A-2D in a closed position and showing a compressible optical zoom portion of a camera in a compressed position according to an implementation consistent with principles of the invention;

FIG. 3C is a side elevational view of the exemplary slider device of FIGS. 2A-2D, 3A, and 3B in a partially opened position and showing the compressible optical zoom portion in an expanded position according to an implementation consistent with principles of the invention;

FIG. 4A is a front view of an exemplary extendible flash version of the exemplary device of FIG. 1 in a closed position according to an implementation consistent with principles of the invention;

FIG. 4B is a front view of a substrate and the extendible flash of the device of FIG. 4A in a closed position according to an implementation consistent with principles of the invention;

FIG. 4C is a front view of the extendible flash device of FIG. 4A in an open position according to an implementation consistent with principles of the invention;

FIG. 4D is a front view of the substrate and the extendible flash of the device of FIGS. 4A and 4C in an open position according to an implementation consistent with principles of the invention;

FIG. 4E is a partial detailed cutaway view of the substrate and the extendible flash of FIG. 4B and showing the extendible flash in the closed position according to an implementation consistent with principles of the invention;

FIG. 4F is a partial detailed cutaway view of the substrate and the extendible flash of FIG. 4D and showing the extendible flash in the open position according to an implementation consistent with principles of the invention.

DETAILED DESCRIPTION

Figure 1A:
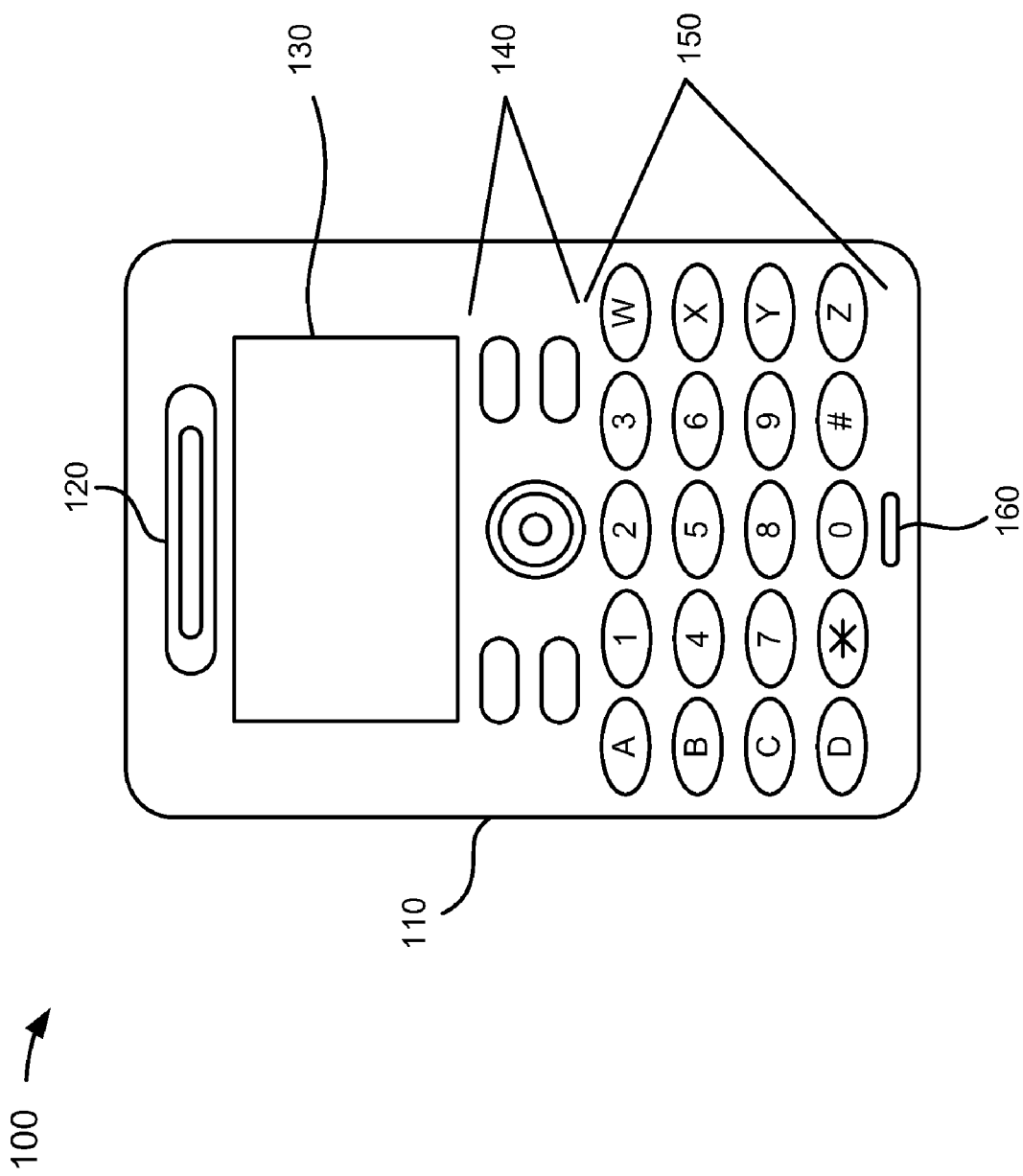
FIGS. 1A and 1B are diagrams of an exemplary device in which systems and methods consistent with principles of the invention may be implemented.

The following detailed description of the invention refers to the accompanying drawings. The same reference numbers in different drawings may identify the same or similar elements. Also, the following detailed description does not limit the invention.

Implementations consistent with principles of the invention may relate to a device that includes a camera with a compressible optical zoom portion. By using a compressible optical zoom portion and providing a space within the device when the device is placed in a camera mode, the optical zoom portion of the camera may expand into the space in the device and may provide optical zoom camera functions. For example, in one implementation, a space may be provided within the device when a portion (e.g., a portion containing a keypad and/or control buttons) of the device slides away from a protective cover of the device. The optical zoom portion of the camera may be compressed when not in use, but may expand when the camera is in use and the device portion is slid away from the protective cover, creating a space for the optical zoom portion of the camera. The optical zoom portion may remain within the protective cover of the device and may be protected even when in use. If the optical zoom portion of the camera is expanded, the internal lens(es) of the optical zoom portion may move according to the optical needs (e.g., the zoom required) of the camera. In another implementation, an extendible flash may be provided for the device. The extendible flash may extend outside of the protective cover of the device. If the extendible flash extends outside the protective cover, a space may be created within the device. The space may be used for expansion of the optical zoom portion of the camera. The optical zoom portion may remain within the protective cover of the device and may be protected even when in use. If the optical zoom portion of the camera is expanded, the internal lens(es) of the optical zoom portion may move according to the optical needs of the camera.

The description to follow will describe a device. As used herein, a "device" may include a radiotelephone; a personal communications system (PCS) terminal that may combine a cellular radiotelephone with data processing, facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; a personal computer; an MP3 player (e.g., an iPod); a printer; a facsimile machine; a pager; a camera (e.g., contemporary camera or digital camera); a video camera (e.g., a camcorder); a calculator; binoculars; a telescope; and/or any other device capable of utilizing a camera.

As used herein, a "camera" may include a device that may capture and store images and/or video. For example, a digital camera may be an electronic device that may capture and store images and/or video electronically instead of using photographic film as in contemporary cameras. A digital camera may be multifunctional, with some devices capable of recording sound and/or video, as well as images.

A camera may include an optical zoom portion. As used herein, an "optical zoom portion" may include a mechanically, electrically, and/or electromechanically controlled assembly of lens(es) whose focal length may be changed, as opposed to a prime lens, which may have a fixed focal length. "Zoom lenses" may be described by the ratio of their longest and shortest focal lengths. For example, a zoom lens with focal lengths ranging from 100 millimeters (mm) to 400 mm may be described as a "4×" zoom. Zoom lenses may range, for example, from more than about "1×" to about "12×". Some digital cameras may allow cropping and enlarging of the resultant image once the limits of a zoom lens have been reached, in order to emulate the effect of a longer length focal length zoom lens. There may be a variety of designs for zoom lenses. For example, many zoom lenses may include multiple individual lenses that may be either fixed and/or may slide axially along the body of the lens. If the magnification of the zoom lens changes, movement of the focal plane may be compensated for to keep the focused image sharp. This compensation may be done by mechanical means (e.g., moving the lens assembly as the magnification of the lens changes) and/or optically (e.g., arranging the position of the focal plane to vary as little as possible as the lens is zoomed). A zoom lens may be divided into two parts, a focusing lens preceded by an afocal zoom system (e.g., an arrangement of fixed and movable lens elements that may alter the magnification of the lens system). The afocal zoom system may include, for example, two positive lenses of equal focal length with a negative (e.g., diverging) lens between them with a focal length of less than half the focal length of the positive lenses. One positive lens may be fixed, and the other positive lens and the negative lens may move axially in a non-linear relationship. Such movement may be performed, for example, by an arrangement of gears and cams in the lens housing, although computer-controlled servos may also be used. As the lenses move, the overall magnification of the system may vary and change the effective focal length of the zoom lens.

Exemplary Devices

Figure 1B:
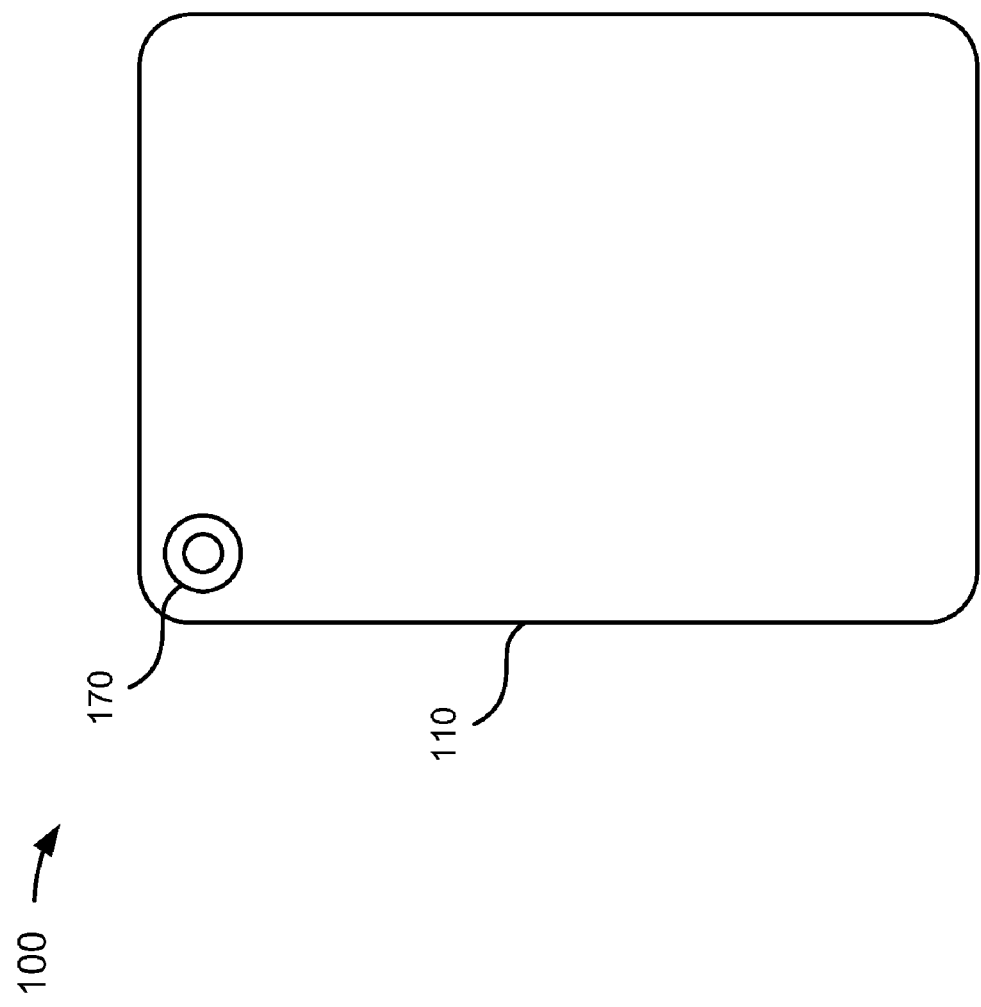

FIGS. 1A and 1B are diagrams of an exemplary device 100 according to an implementation consistent with principles of the invention. As shown in FIGS. 1A and 1B, device 100 may include a housing 110, a speaker 120, a display 130, control buttons 140, a keypad 150, a microphone 160, and/or a camera 170. Housing 110 may protect the components of device 100 from outside elements. Speaker 120 may provide audible information to a user of device 100. Display 130 may provide visual information to the user. For example, display 130 may provide information regarding incoming or outgoing calls, games, phone books, the current time, emails, etc. Control buttons 140 may permit the user to interact with device 100 to cause device 100 to perform one or more operations. Keypad 150 may include a standard telephone keypad and/or or may include additional keys to enable typing information into device 100. Microphone 160 may receive audible information from the user.

Camera 170 may enable a user to capture and/or store video and/or images (e.g., pictures). Camera 170 may be provided on the front side of device 100 and/or the rear side of device (as shown in FIG. 1B). The internal components of camera 170 are described more fully below.

First Exemplary Device Arrangement

FIGS. 2A-2D provide various views of an exemplary slider version of the exemplary device of FIG. 1 (e.g., device 100) according to implementations consistent with principles of the invention. As shown in the front view of FIG. 2A, the slider version of the device (e.g., device 100) may include a front portion 210 that covers a rear movable portion 220 (e.g., partially shown in phantom lines in FIG. 2A).

Figure 2B:
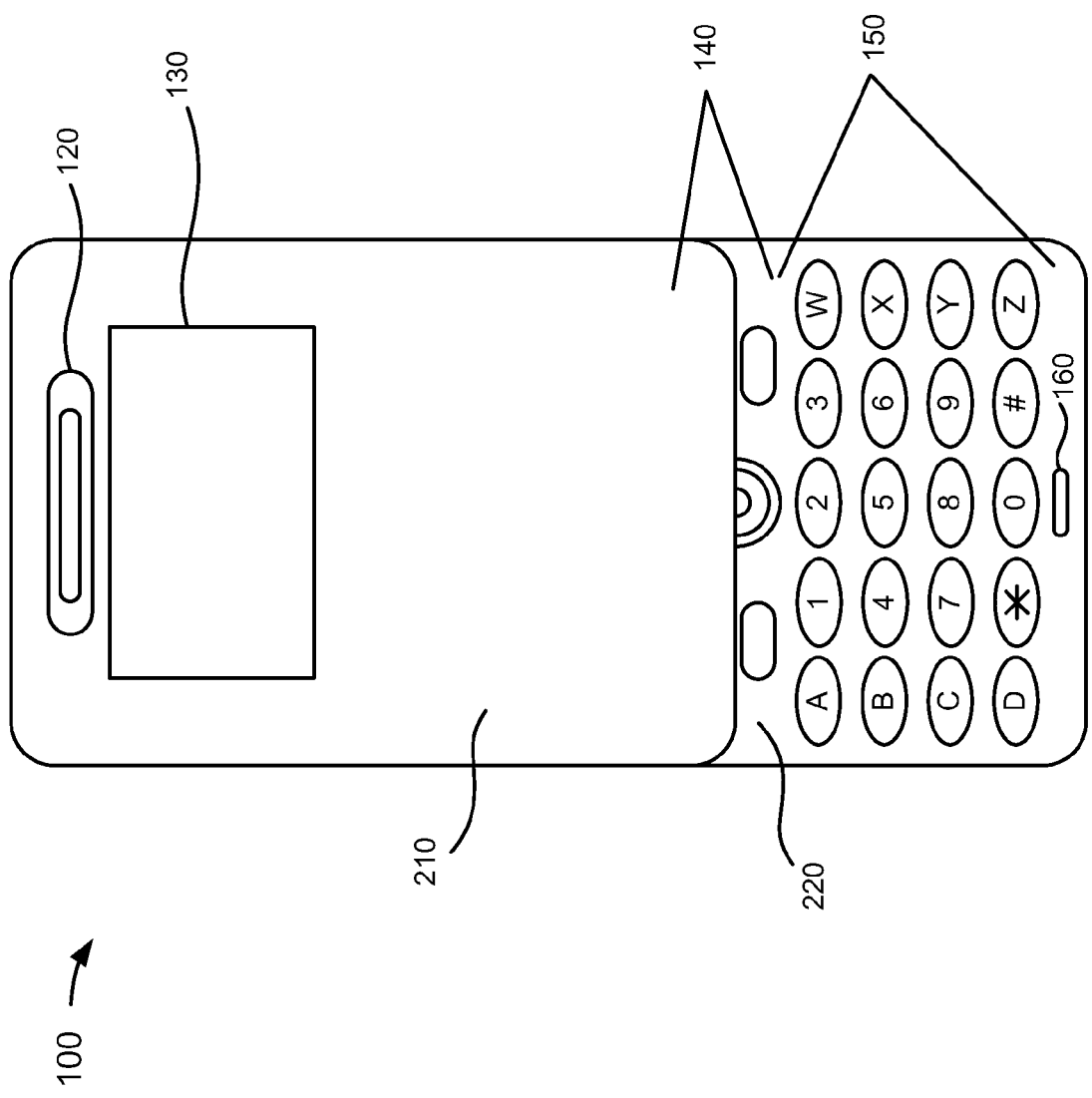
FIG. 2B is a front view of the exemplary slider device of FIG. 2A in a partially opened position according to an implementation consistent with principles of the invention.

Front portion 210 and rear moveable portion 220 may be combined to form device 100. In one implementation, for example front portion 210 and rear movable portion 220 may be two separate components that may be slideably joined together in a longitudinal direction. Rear portion 220 may be slid against front portion 210 to protrude beyond front portion 210 at a predetermined distance, as shown in FIG. 2B. As further shown in FIG. 2B, speaker 120 and display 130 may be provided on a front surface of front portion 210, and control buttons 140 and/or keypad 150 may be provided on a front surface of rear portion 220. Control buttons 140 and/or keypad 150 may be exposed when rear portion 220 is slid away from and protrudes beyond front portion 210 (i.e., the open position and/or partially open position shown in FIG. 2B). Control buttons 140 and/or keypad 150 may be covered by the front portion 210 when rear portion 220 and front portion 210 overlap each other, as shown by the closed position of FIG. 2A.

In accordance with an exemplary implementation, a structure for providing the sliding operation of front portion 210 and rear portion 220 with respect to each other may include a main plate and a slide plate. In one implementation, the main plate may be fixed to front portion 210, and the slide plate may be fixed to rear portion 220. In another implementation, the main plate may be connected to rear portion 220, and the slide plate may be connected to front portion 210. Guide channels may be formed on both lateral sides of the main plate in a longitudinal direction. Holes may be provided through lateral ends of the main plate. The holes may receive an end of a torsion spring. Guide ribs may be formed at both lateral ends of the slide plate such that the slide plate may be guided and slid along the guide channels. The main plate and the slide plate may be interconnected through the torsion spring. One end of the torsion spring may be fitted into one hole of the main plate while the other end may be fitted into a hole of the slide plate. A pair of the torsion springs may be provided in a symmetrical manner. In operation, when the rear portion 220 is slid away from front portion 210, the slide plate may be slid along the main plate. The torsion spring may provide an elastic force such that rear portion 220 may be kept in a state where it overlaps front portion 210 (i.e., the closed position of FIG. 2A) and may fully protrude beyond front portion 210 (i.e., the open position of FIG. 2B). In other words, if a user moves the slide plate to a certain position with respect to the main plate, the slide plate may be securely moved to a predetermined position by means of the elastic force of the torsion spring.

Figure 2C:
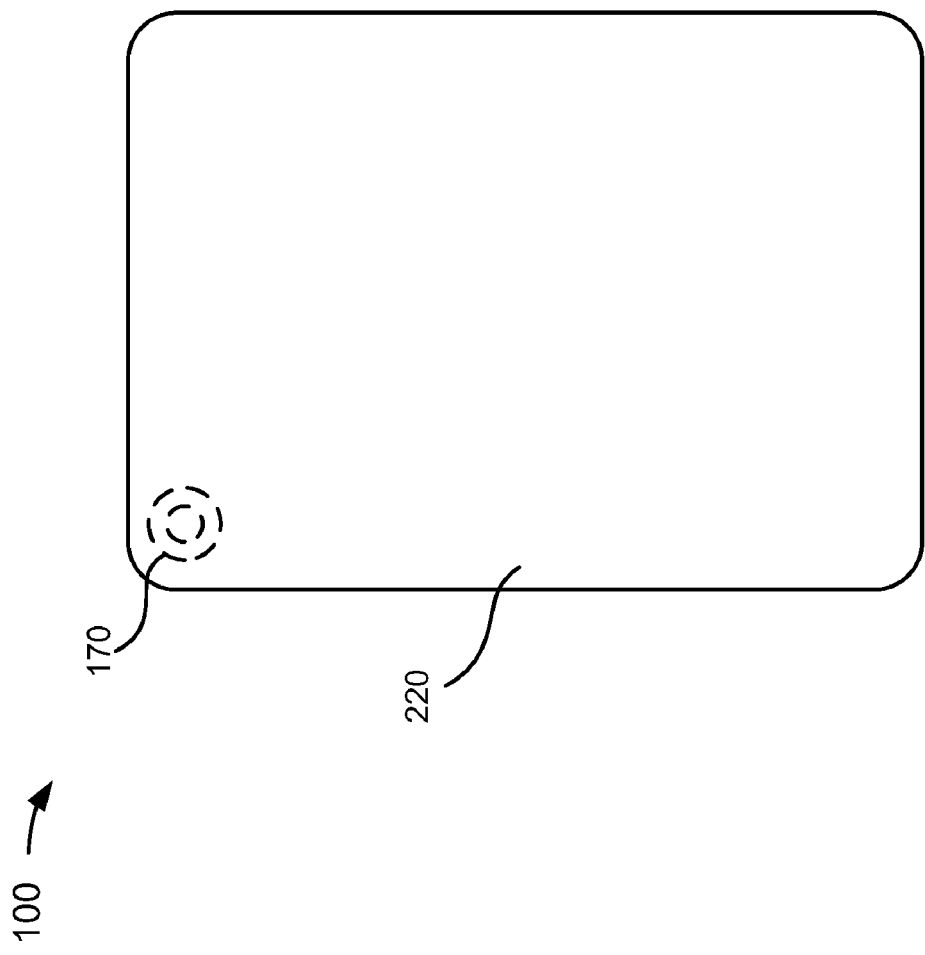
FIG. 2C is a rear view of the exemplary slider device of FIGS. 2A and 2B in a closed position according to an implementation consistent with principles of the invention.
Figure 2D:
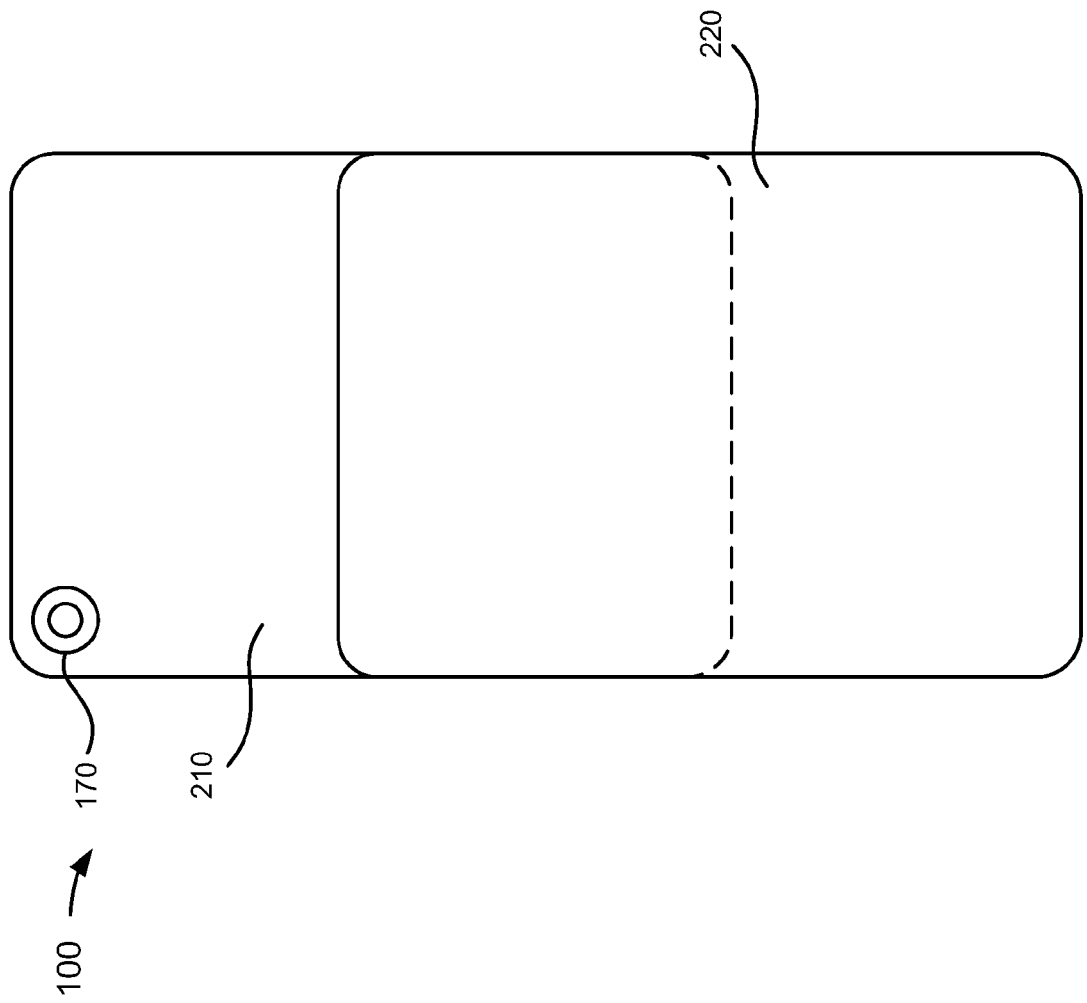
FIG. 2D is a rear view of the exemplary slider device of FIGS. 2A-2C in a partially opened position according to an implementation consistent with principles of the invention.

As shown in FIGS. 2C and 2D, if rear portion 220 is in a closed position (as shown in FIG. 2C), rear portion 220 may protect camera 170 provided on a rear surface of front portion 210. If rear portion 220 is in an open position and/or a partially open position (as shown in FIG. 2D), rear portion 220 may not protect camera 170 and camera 170 may be exposed for use by device 100.

Front portion 210 and/or rear portion 220 may be formed in a variety of sizes and shapes depending on their use in device and/or the size of device 100. For example, in one implementation, front portion 210 and/or rear portion 220 may be smaller in size if they are provided in a cellular phone, than if they are provided in a device larger than a cellular phone. The dimensions (e.g., lengths, widths, or thicknesses) of front portion 210 and/or rear portion 220 may depend on the material, shape, and/or the degree of protection to be provided by front portion 210 and/or rear portion 220. For example, smaller thicknesses may produce a less rigid, less protective housing 110.

Front portion 210 and/or rear portion 220 may be made from a variety of materials, including any of the materials used to make the housings of any of the devices described above. For example, in one implementation, front portion 210 and/or rear portion 220 may be made from thermoplastics, metals, elastomers (e.g., synthetic rubber and/or natural rubber), and/or other similar materials.

FIG. 3A is a side elevational view, in partial cross section, of the exemplary slider device of FIGS. 2A-2D in a closed position. FIG. 3A also shows a compressible optical zoom camera in a compressed position according to an implementation consistent with principles of the invention. The compressible optical zoom camera may correspond to camera 170 shown in FIGS. 2C and 2D, and/or may include a prism 310 and an optical zoom portion 320. FIG. 3A shows prism 310 and optical zoom portion 320 for simplicity, however, the compressible optical zoom camera (e.g., camera 170) according to implementations consistent with the invention may include more or fewer elements than prism 310 and optical zoom portion 320.

Prism 310 may be formed in a variety of sizes and shapes depending on its use in device and/or the size of device 100. For example, in one implementation, prism 310 may be smaller in size if it is provided in a cellular phone, than if they are provided in a device larger than a cellular phone. The dimensions (e.g., lengths, widths, or thicknesses) of prism 310 may depend on the material, shape, and/or the use of prism 310 by device. For example, in one implementation, prism 310 may be a geometric figure bounded by planes, whose bases may be equal polygons, similarly oriented in parallel planes. The planes defined by corresponding (and hence parallel) sides of these polygons may intersect in lines that are all parallel, so that the side faces of the prism may be parallelograms. In another implementation, prism 310 may a triangular prism, a rectangular prism, a hexagonal prism, and/or other similar types of prisms.

Prism 310 may be made from a variety of materials, including any of the materials used to make camera prisms. For example, in one implementation, prism 310 may be made from optical thermoplastics, optical glass, and/or other similar optical materials. In another implementation, the angles and/or materials of prism 310 may be selected based on the wavelength(s) of light to exit prism 310.

As further shown in FIG. 3A, optical zoom portion 320 may include a fixed lens 330 and a moveable lens 340. FIG. 3A shows optical zoom portion 320 with two lenses (e.g., fixed lens 330 and moveable lens 340) for simplicity, however, in one implementation, more or fewer fixed and/or moveable lenses may be provided within optical zoom portion 320. If the magnification of the optical zoom changes, movement of the focal plane may be compensated for by mechanical means (e.g., moving moveable lens 340 as the magnification changes) and/or optically (e.g., arranging the position of the focal plane to vary as little as possible as moveable lens 340 is zoomed). Such mechanical movement may be performed, for example, by an arrangement of gears and cams (not shown) in optical zoom portion 320, although computer-controlled servos may also be used. As moveable lens 340 moves, the overall magnification of the system may vary and change the effective focal length.

Optical zoom portion 320 may be formed in a variety of sizes and shapes depending on its use in device 100, and/or the size of device 100. For example, in one implementation, optical zoom portion 320 may be smaller in size if it is provided in a cellular phone, than if it is provided in a device larger than a cellular phone. In another implementation, optical zoom portion 320 may be compressible. In other words, the dimensions (e.g., lengths, widths, etc.) of optical zoom portion 320 may compress (e.g., get smaller) when optical zoom portion 320 is not in use. FIG. 3A shows optical zoom portion 320 in its compressed position.

Figure 3B:
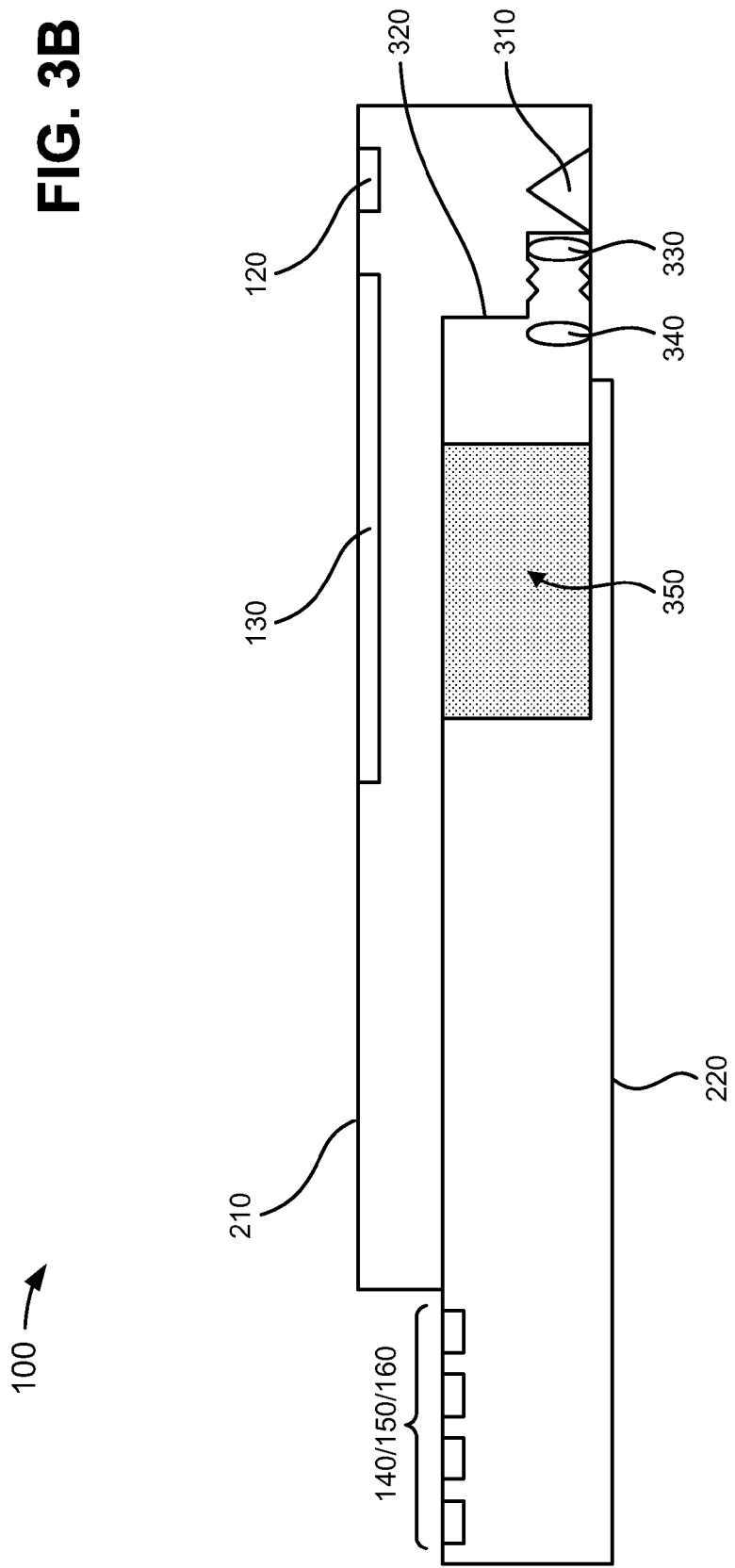
FIG. 3B is a side elevational view of the exemplary slider device of FIGS. 2A-2D and 3A in a partially opened position and showing a space created by the partially opened position according to an implementation consistent with principles of the invention.

FIG. 3B is a side elevational view of the exemplary slider device of FIGS. 2A-2D and 3A, in a partially opened position. As further shown in FIG. 3B, a space 350 may be created by the opened position according to an implementation consistent with principles of the invention. Space 350 may be created between front portion 210 and/or rear portion 220 of device 100. Space 350 may become larger as rear moveable portion 220 extends away from front portion 210. In one implementation, rear portion 220 may be manually moved away from front portion 210 by exerting a pulling force on rear portion 210. In another implementation, rear portion 220 may be mechanically moved away from front portion 210 with a release mechanism (e.g., depressing a button may cause a mechanism (e.g., a spring) to force rear portion 220 away from front portion 210). In still another implementation, rear portion 220 may be electromechanically moved away from front portion 210 with an electromechanical mechanism (e.g., an electric motor may force rear portion 220 away from front portion 210). The slider device of FIGS. 2A-2D may be returned to its closed position using similar manual, mechanical, and/or electromechanical techniques. In an alternative implementation, front portion 210 may be moveable and rear portion 220 may be fixed. In such an arrangement similar manual, mechanical, and/or electromechanical techniques may be used to move front portion 210 towards and/or away from rear portion 220.

As further shown in FIG. 3B, optical zoom portion 320 may be in its compressed position. However, in one implementation, upon activation of the camera (e.g., camera 170), optical zoom portion 320 may assume an expanded position, as shown in FIG. 3C. In other words, the dimensions (e.g., lengths, widths, etc.) of optical zoom portion 320 may expand (e.g., get larger) when optical zoom portion 320 is being used. In one implementation consistent with principles of the invention, as shown in FIG. 3C, optical zoom portion 320 may expand into space 350 created between front portion 210 and rear portion 220 by the sliding movement of rear portion 220 away from front portion 210. As further shown in FIG. 3C, when optical zoom portion 320 expands, moveable lens 340 may move away from fixed lens 330. Magnification (i.e., the zoom function) may be adjusted based on the distance between moveable lens 340 and fixed lens 330.

In one implementation, optical zoom portion 320 may be mechanically expanded with a mechanical mechanism (e.g., gears, cams, etc. may be used to expand optical zoom portion 320). In still another implementation, optical zoom portion 320 may be electromechanically expanded with an electromechanical mechanism (e.g., an electric motor may expand optical zoom portion 320). Optical zoom portion 320 may be returned to its compressed position using similar mechanical and/or electromechanical techniques.

Although FIG. 3C shows optical zoom portion 320 extending into a portion of space 350, optical zoom portion 320 may be sized to fit within the entire length of space 350. The size of optical zoom portion 320 and space 350, as well as the optical zoom magnification (e.g., 4x, 5x, etc.) may determine how far optical zoom portion 320 extends into space 350.

In an exemplary operation (e.g., when camera 170 and/or optical zoom portion 320 are operating), light (e.g., representing an image and/or video to be captured by camera 170) may enter prism 310 and be reflected to optical zoom portion 320. Based on the spacing between lenses 330 and 340, optical zoom portion 320 may adjust the magnification of the image and/or video reflected by prism 310. The magnified image and/or video may be captured and/or stored in a typical manner performed by any of the cameras described above (e.g., camera 170).

Although FIGS. 2A-2D and 3A-3C show rear portion 220 sliding longitudinally away from the bottom of front portion 210, rear portion 220 may extend away from front portion 210, to create space 350, in a variety of ways. For example, in one implementation, rear portion 220 may extend longitudinally away from the top of front portion 210, to create space 350. In other implementation, rear portion 220 may rotate to one of the sides of front portion 210, and/or may create a space between front portion 210 and rear portion 220 for accommodating optical zoom portion 320.

Although not shown in the figures, optical zoom portion 320 may be prevented from expanding when the camera (e.g., camera 170) is activated if space 350 is not provided for optical zoom portion 320. For example, device 100 may sense when rear portion 220 may be moved enough away from front portion 210 to accommodate optical zoom portion 320. In other words, device 100 may sense when space 350 is large enough to accommodate the dimensions of optical zoom portion 320.

Second Exemplary Device Arrangement

FIGS. 4A-4F provide various views of an exemplary extendible flash version of the exemplary device of FIG. 1 (e.g., device 100) according to implementations consistent with principles of the invention. As shown in the front view of FIG. 4A, the extendible flash version of the device (e.g., device 100) may include an extendible flash 410 and a substrate 420.

Extendible flash 410 may include a variety of camera flashes. For example, extendible flash 410 may include a built-in automatic flash that may be tied into an autoexposure system of the camera (e.g., camera 170), an electronic xenon flash lamp (e.g., an electronic flash that may contain a tube filled with xenon gas, where electricity may be discharged to generate an electrical arc that emits a short flash of light), a microflash (e.g., a high-voltage flash unit designed to discharge a flash of light with a quick, sub-microsecond duration), and/or any other device that may produce an instantaneous flash of light (e.g., around 1/1000 of a second) at a color temperature (e.g., of about 5500 K) to help illuminate a scene. While extendible flash 410 may be used for a variety of reasons (e.g. capturing quickly moving objects, creating a different temperature light than the ambient light), it may also be used to illuminate scenes that do not have enough available light to adequately expose an image. The term "flash" may refer to the flash of light itself, or as a colloquialism for the electronic flash unit which discharges the flash of light.

Extendible flash 410 may be formed in a variety of shapes and sizes depending on its use in device 100 and/or the size of device 100. For example, in one implementation as shown in FIG. 4A, extendible flash 410 may be sized to fit within housing 110 of device 100. In another implementation, as shown in FIG. 4B, extendible flash 410 may be shaped to be received by substrate 420. The dimensions (e.g., length, width, etc.) of extendible flash 410 may depend on the material, function, and/or shape of extendible flash 410, and/or the size of device 100. For example, extendible flash 410 may be larger if more light is to be emitted by extendible flash 410, but not so large as to occupy too much space in device 100.

Extendible flash 410 may connect to housing 110 in a variety of ways. In one implementation, for example, one side of housing 110 may slideably receive extendible flash 410 with a conventional connection mechanism (e.g., a slot sized to accommodate extendible flash 410, guide rails in an opening, etc.). Although FIG. 4A shows extendible flash 410 being connected to one side of housing 110, in one implementation consistent with principles of the invention, extendible flash 410 may slideably connect to the other side of housing 110, to the top of housing 110, and/or to the bottom of housing 110. FIGS. 4A and 4B show extendible flash 410 in a closed position. In other words, extendible flash 410 may be provided almost entirely within housing 110.

Substrate 420 may be provided within housing 110 of device 100. Substrate 420 may include any electronics based substrate, e.g., a printed circuit board (PCB), rigid-flex circuits, flex circuits, semiconductor packages, multichip modules, micro electro mechanical systems (MEMS), ceramic circuits, etc. Substrate 420 may be formed in a variety of sizes and shapes depending upon its use in device 100, and/or the size of device 100. For example in one implementation, substrate 420 may be smaller in size if it is provided in a cellular phone, than if it is provided in a laptop computer. Substrate 420 may be made from a variety of materials, including any of the materials used to make existing electronics based substrates (e.g., PCBs). For example in one implementation, substrate 420 may include conductive pathways, or traces, which may be etched from copper sheets laminated onto a non-conductive substrate. Substrate 420 may include a variety of electrical components depending upon its use in the device. For example, substrate 420 may include switches, contacts, traces, capacitors, resistors, inductors, varistors, diodes, transistors, oscillators, resonators, relays, etc. In one implementation, as shown in FIGS. 4A and 4B, substrate 420 may include a camera (e.g., camera 170).

FIG. 4C is a front view of device 100 and shows extendible flash 410 in an open position according to an implementation consistent with principles of the invention. In other words, extendible flash 410 may extend away from housing 110 of device 100. In one implementation, extendible flash 410 may be manually moved away from housing 110 by exerting a pulling force on extendible flash 410. In another implementation, extendible flash 410 may be mechanically moved away from housing 110 with a release mechanism (e.g., depressing a button may cause a mechanism (e.g., a spring) to force extendible flash 410 from housing 110). In still another implementation, extendible flash 410 may be electromechanically moved away from housing 110 with an electromechanical mechanism (e.g., an electric motor may force extendible flash 410 from housing 110). Extendible flash 410 may be returned to its closed position within housing 110 using similar manual, mechanical, and/or electromechanical techniques. When extendible flash 410 moves away from housing 110, a space 430 may be formed between extendible flash 410 and substrate 420, as shown in FIG. 4D. Space 430 may become larger as extendible flash 410 extends away from substrate 420.

As shown in FIG. 4E, optical zoom portion 320 may be provided for the camera (e.g., camera 170) and/or may or may not be slideably connected to substrate 420. As further shown in FIG. 4E, optical zoom portion 320 may be in its compressed position. However, upon activation of the camera (e.g., camera 170), optical zoom portion 320 may assume its expanded position, as shown in FIG. 4F. In other words, the dimensions (e.g., lengths, widths, etc.) of optical zoom portion 320 may expand (e.g., get larger) when optical zoom portion 320 is being used. In one implementation consistent with principles of the invention, as shown in FIG. 4F, optical zoom portion 320 may expand into space 430 created between extendible flash 410 and substrate 420 by the sliding movement of extendible flash 410 away from substrate 420. As further shown in FIG. 4F, when optical zoom portion 320 expands, the moveable lens (e.g., lens 340) may move away from the fixed lens (e.g., lens 330). Magnification (i.e., the zoom function) may be adjusted based on the distance between the moveable lens and the fixed lens 330.

In one implementation, optical zoom portion 320 may be mechanically expanded with a mechanical mechanism (e.g., gears, cams, etc. may be used to expand optical zoom portion 320). In still another implementation, optical zoom portion 320 may be electromechanically expanded with an electromechanical mechanism (e.g., an electric motor may expand optical zoom portion 320). Optical zoom portion 320 may be returned to its compressed position using similar mechanical and/or electromechanical techniques.

Although FIG. 4F shows optical zoom portion 320 extending into a portion of space 430, optical zoom portion 320 may be sized to fit within the entire length of space 430. The size of optical zoom portion 320 and space 430, as well as the optical zoom magnification (e.g., 4×, 5×, etc.) may determine how far optical zoom portion 320 extends into space 430.

Although not shown in the figures, optical zoom portion 320 may be prevented from expanding when the camera (e.g., camera 170) is activated if space 430 is not provided for optical zoom portion 320. For example, device 100 may sense when extendible flash 410 may be moved enough away from housing 110 to accommodate optical zoom portion 320. In other words, device 100 may sense when space 430 is large enough to accommodate the dimensions of optical zoom portion 320.

Exemplary Process

Figure 5:
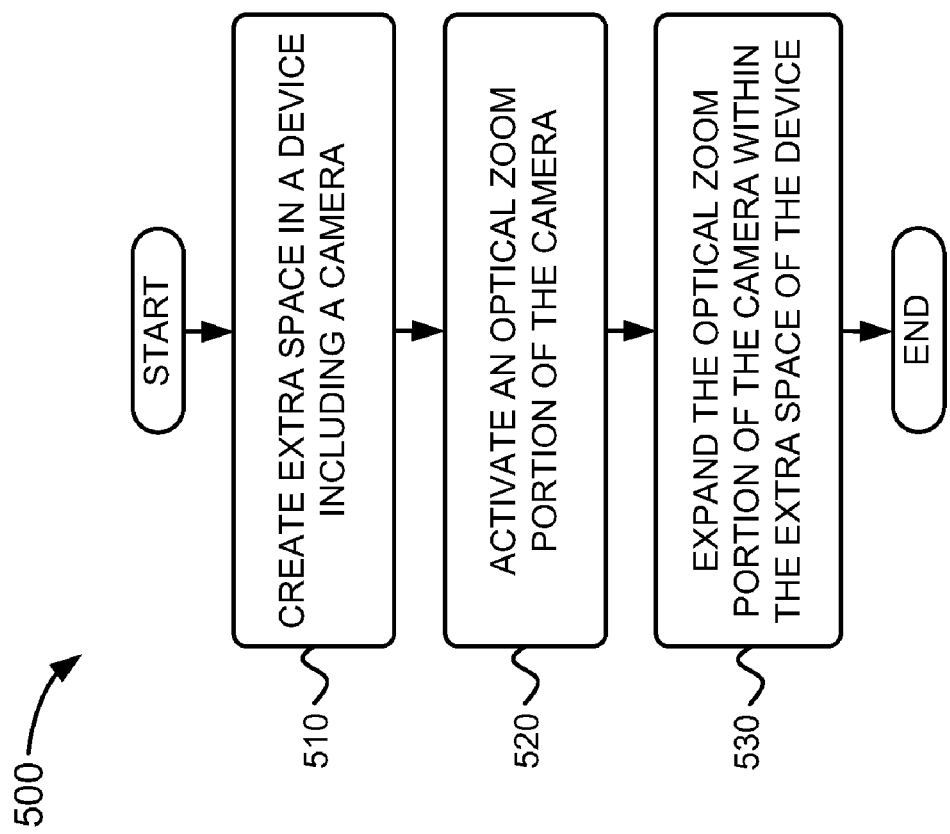
FIG. 5 is a flowchart of an exemplary process according to an implementation consistent with principles of the invention.

FIG. 5 is a flowchart of an exemplary process according to an implementation consistent with principles of the invention. As shown in FIG. 5, a process 500 may create an internal extra space within a device that includes a camera with an optical zoom portion (block 510). For example, in one implementation described above in connection with FIGS. 2A-2D and 3A-3C, space 350 may be created in the slider version of device 100, between front portion 210 and/or rear portion 220 of device 100. Space 350 may become larger as rear movable portion 220 extends away from front portion 210. In another implementation described above in connection with FIGS. 4A-4F, space 430 may be formed in the extendible flash version of device 100, between extendible flash 410 and substrate 420 when extendible flash 410 moves away from housing 110. Space 430 may become larger as extendible flash 410 extends away from substrate 420.

Process 500 may activate the optical zoom portion of the camera (block 520). For example, in one implementation described above in connection with FIGS. 2A-2D and 3A-3C, the slider version of device 100 may include a compressible optical zoom camera (e.g., camera 170) that may include optical zoom portion 320. In another implementation described above in connection with FIGS. 4A-4F, the extendible flash version of device 100 may include camera 170, and/or optical zoom portion 320 may be provided for camera 170 and/or may or may not be slideably connected to substrate 420 of device 100. Optical zoom portion 320 may be activated upon camera activation, upon creation of the internal space in the device, and/or a combination of the aforementioned.

As further shown in FIG. 5, process 500 may expand the optical zoom portion of the camera within the internal extra space of the device (block 530). For example, in one implementation described above in connection with FIGS. 2A-2D and 3A-3C, upon activation of the camera (e.g., camera 170), optical zoom portion 320 may assume an expanded position. In other words, the dimensions (e.g., lengths, widths, etc.) of optical zoom portion 320 may expand (e.g., get larger) when optical zoom portion 320 is being used. Optical zoom portion 320 may expand into space 350 created between front portion 210 and rear portion 220 by the sliding movement of rear portion 220 away from front portion 210. When optical zoom portion 320 expands, moveable lens 340 may move away from fixed lens 330. Magnification (i.e., the zoom function) may be adjusted based on the distance between moveable lens 340 and fixed lens 330. In another implementation described above in connection with FIGS. 4A-4F, upon activation of the camera (e.g., camera 170), optical zoom portion 320 may expand into space 430 created between extendible flash 410 and substrate 420 by the sliding movement of extendible flash 410 away from substrate 420.

CONCLUSION

Implementations consistent with principles of the invention may relate to a device that includes a camera with a compressible optical zoom portion. By using a compressible optical zoom portion and providing a space in the device when the device is placed in a camera mode, the optical zoom portion may expand into the space in the device and may provide optical zoom camera functions. For example, in one implementation, a space may be provided within the device when a moveable portion (e.g., a portion containing a keypad and/or control buttons) of the device slides away from a protective cover of the device. The optical zoom portion of the camera may be compressed when not in use, but may expand when the camera is in use and the moveable portion is slid away from the protective cover, creating a space for the optical zoom portion. The optical zoom portion may remain within the protective cover of the device even when in use. If the optical zoom portion is expanded, the internal lens(es) of the optical zoom portion may move according to the optical needs (e.g., the zoom required) of the camera. In another implementation, an extendible flash may be provided for the device. The extendible flash may extend outside of the protective cover of the device. If the extendible flash extends outside the protective cover, a space may be created within the device. The space may be used for expansion of the optical zoom portion. The optical zoom portion may remain within the protective cover of the device even when in use.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIG. 5, the order of the acts may be modified in other implementations consistent with principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a housing with an opening;
   an extendible flash provided in the housing opening and configured to extend from the opening, an internal space being formed when the extendible flash extends from the opening, where the internal space does not exist prior to the extendible flash extending from the opening; and
   a camera including an optical zoom portion provided within the housing, the optical zoom portion configured to extend into the internal space.

2. The device of claim 1, further comprising:
   a substrate provided within the housing, the internal space being formed between the substrate and the extendible flash when the extendible flash extends from the opening.

3. The device of claim 1, where the housing protects the optical zoom portion of the camera.

4. The device of claim 1, where the optical zoom portion expands when the camera is in use and the internal space is formed.

5. The device of claim 1, where the optical zoom portion compresses when the camera is not in use.

6. The device of claim 1, where the optical zoom portion is prevented from expanding if the camera is in use and the internal space is not formed.

7. The device of claim 1, where the optical zoom portion comprises at least one moveable lens and at least one fixed lens, the moveable lens moving away from the fixed lens when the optical zoom portion expands into the internal space.

8. The device of claim 1, further comprising at least one of:
   a display;
   a speaker;
   a keypad;
   a control button; or
   a microphone.

9. The device of claim 1, where the extendible flash is one of manually, mechanically, or electromechanically extended from the opening.

10. The device of claim 1, where the optical zoom portion is one of mechanically or electromechanically expanded into the internal space.

11. A method implemented in camera, the method comprising:
   extend a flash from an opening in a housing of the camera;
   forming, in the camera, an internal space when the extendible flash extends from the opening, where the internal space does not exist prior to the extendible flash extending from the opening; and
   expanding an optical zoom portion of the camera, provided within the housing, into the internal space.

12. The method of claim 11, where the internal space is formed between a substrate, in the housing, and the extendible flash when the extendible flash extends from the opening.

13. The method of claim 11, where the housing protects the optical zoom portion of the camera.

14. The method of claim 11, where the optical zoom portion expands when the camera is in use and the internal space is formed.

15. The method of claim 11, where the optical zoom portion compresses when the camera is not in use.

16. The method of claim 11, where the optical zoom portion is prevented from expanding if the camera is in use and the internal space is not formed.

17. The method of claim 11, where the optical zoom portion comprises at least one moveable lens and at least one fixed lens, the moveable lens moving away from the fixed lens when the optical zoom portion expands into the internal space.

18. The method of claim 11, where extending the flash includes one of manually, mechanically, or electromechanically extending the flash from the opening.

19. The method of claim 11, where expanding the optical zoom portion includes one one of mechanically or electromechanically expanding the optical zoom portion into the internal space.

20. A device comprising:
   extending means for extending a flash from an opening in a housing of the device;
   forming means for forming, in the device, an internal space when the extendible flash extends from the opening, where the internal space does not exist prior to the extendible flash extending from the opening; and
   expanding means for expanding an optical zoom portion of the camera, provided within the housing, into the internal space.

* * * * *

UNITED STATES PATENT AND TRADEMARK OFFICE
CERTIFICATE OF CORRECTION

| | | |
|---|---|---|
| PATENT NO. | : 7,907,840 B2 | Page 1 of 1 |
| APPLICATION NO. | : 12/686156 | |
| DATED | : March 15, 2011 | |
| INVENTOR(S) | : Göran Schack et al. | |

It is certified that error appears in the above-identified patent and that said Letters Patent is hereby corrected as shown below:

Column 14, line 23, delete "one" (the first occurrence).

Signed and Sealed this
Twelfth Day of April, 2011

David J. Kappos
*Director of the United States Patent and Trademark Office*